US008691307B2

(12) United States Patent
Sardo

(10) Patent No.: US 8,691,307 B2
(45) Date of Patent: Apr. 8, 2014

(54) COMBINATIONS OF ABIETIC ACID ESTERS WITH ONE OR MORE TERPENES AND USE THEREOF FOR COATING FRUIT OR VEGETABLES

(75) Inventor: Alberto Sardo, Chateaurenard (FR)

(73) Assignee: Xeda International, Saint Andiol (FR)

( * ) Notice: Subject to any disclaimer, the term of this patent is extended or adjusted under 35 U.S.C. 154(b) by 283 days.

(21) Appl. No.: 12/449,583

(22) PCT Filed: Feb. 13, 2008

(86) PCT No.: PCT/FR2008/050233
§ 371 (c)(1),
(2), (4) Date: Sep. 29, 2009

(87) PCT Pub. No.: WO2008/104711
PCT Pub. Date: Sep. 4, 2008

(65) Prior Publication Data
US 2010/0092631 A1    Apr. 15, 2010

(30) Foreign Application Priority Data

Feb. 16, 2007  (FR) ..................................... 07 53308
Jul. 10, 2007  (FR) ..................................... 07 56378

(51) Int. Cl.
*A23F 5/00*   (2006.01)

(52) U.S. Cl.
USPC ............ 426/310; 426/102; 426/302; 426/320

(58) Field of Classification Search
USPC ....................................................... 426/102
See application file for complete search history.

(56) References Cited

U.S. PATENT DOCUMENTS

| 2,333,887 | A  | * | 11/1943 | Redlinger |
|-----------|----|----|---------|-----------|
| 2,755,189 | A  |    | 7/1956  | Gericke   |
| 3,437,617 | A  | *  | 4/1969  | Bogle ............................ 106/13 |
| 5,489,442 | A  | *  | 2/1996  | Dunn et al. .................. 426/248 |
| 6,482,455 | B1 |    | 11/2002 | Freire et al. |
| 6,723,364 | B1 | *  | 4/2004  | Bompeix et al. ............. 426/320 |
| 7,285,579 | B2 | *  | 10/2007 | Ghoshal ......................... 522/31 |
| 2006/0222674 | A1 |  | 10/2006 | Winniczuk |
| 2007/0082018 | A1 | * | 4/2007 | Weiss et al. .................. 424/400 |
| 2007/0196409 | A1 |  | 8/2007 | Winniczuk |
| 2008/0021114 | A1 |  | 1/2008 | Winniczuk et al. |

FOREIGN PATENT DOCUMENTS

| EP | 1 106 070 | 6/2001 |
|----|-----------|--------|
| ES | 2 183 674 | 3/2003 |
| FR | 2 786 664 | 6/2000 |

OTHER PUBLICATIONS

McDaniel: WO2004/112482; published Dec. 2004.*
The Florida Chemical Company: http://www.floridachemical.com/whatisd-limonene.htm; printed Mar. 19, 2012.*
EIC Search; Dec. 5, 2012.*
Hasegawa: P 58078539 A; pub. Dec. 5, 1983.*
Asano: JP,2001-258515,A.; pub. Sep. 25, 2001.*
International Search Report issued Oct. 6, 2008 in the International (PCT) Application of which the present application is the U.S. National Stage. PCT/FR2008/050233.

* cited by examiner

*Primary Examiner* — Patricia George
(74) *Attorney, Agent, or Firm* — Wenderoth, Lind & Ponack, L.L.P.

(57) ABSTRACT

The present invention relates to a method of coating fruit or vegetables, comprising the application of a composition comprising one or more abietic acid ester(s) or mixtures thereof, in combination with one or more terpene(s).

11 Claims, No Drawings

COMBINATIONS OF ABIETIC ACID ESTERS WITH ONE OR MORE TERPENES AND USE THEREOF FOR COATING FRUIT OR VEGETABLES

This application is a U.S. national stage of International Application No. PCT/FR2008/050233 filed Feb. 13, 2008.

Fruit and vegetables, in particular citrus fruit, are generally coated with wax before they are marketed in order to improve their keeping qualities and their appearance for the consumer.

Food resins comprise in particular resins of the lac type, pine resin also known as colophane, abietic acid esters, in particular with glycerol or pentaerythritol. They are in particular used for coating citrus fruit. Nevertheless, their use is limited due to their poor solubility in ethanol, a solvent accepted in the food sector. It has sometimes been envisaged to solubilise these resins or mixtures thereof in alcohol, in water or in a basic medium, for example in the presence of soda, potash. However, the presence of alkaline residues in the final coating of the fruit makes the coating fragile, in particular in the presence of humidity. Moreover, the use of alternative alkaline agents such as alkanolamines is not authorised in Europe.

Abietic acid esters, also known as colophane, in particular with glycerol or pentaerythritol, can be used in the food industry, more particularly for coating citrus fruit. Nevertheless, their use is limited due to their poor solubility in ethanol, a solvent accepted in the food sector.

Natural or synthetic food waxes are also used for coating in the food industry. Waxes have particularly advantageous characteristics of visual appearance and of gas permeability which are superior to those of resins, in particular for control of the weight loss, the maturation and the quality of the fruit or vegetables thus coated. Nevertheless, waxes are generally insoluble in the solvents which are accepted in the food sector, in particular alcohol. The application of molten wax cannot be performed on fruit or vegetables. Consequently, waxes are generally applied in the form of an emulsion, in water, with anionic or non-ionic emulsifiers, optionally in a mixture with one or more natural resins such as those mentioned above.

Essential oils are generally good solvents. Nevertheless, these oils are little used because of their relatively low volatility. Consequently, they necessitate a very long drying time.

Moreover, terpenes have a significant phytotoxicity and are often very aggressive to the skin of the citrus fruit.

It is therefore desirable to make available new improved compositions based on terpenes and abietic acid for coating fruit or vegetables.

Compositions for coating fruit or vegetables, in particular citrus fruit, have now been developed which make it possible to avoid the problems of solubility discussed above.

Moreover, it has been discovered that the presence of one or more terpenes in the aforementioned coating compositions made it possible to greatly improve the coating quality. For without being bound by theory it would seem that the terpene(s), due to its (their) high boiling point, is (are) present until the wax is completely dry. By maintaining the solubility until drying is finished, the coating is thus completely applied.

Compositions based on terpenes and abietic acid esters have now been developed for the treatment of fruit and vegetables, in particular citrus fruit, which make it possible to avoid the drawbacks discussed above.

Thus, according to a first objective, the present invention relates to a method of coating fruit and vegetables, in particular citrus fruit, comprising the application of a composition comprising one or more abietic acid ester(s) or mixtures thereof, in combination with one or more terpene(s) which are not oxygen carriers.

Preferably, the application of the composition is effected after harvesting and before the marketing of the fruit and vegetables, at ambient temperature, by any means usually used for this type of coating. The compositions according to the invention may be applied one or more times.

The composition is preferably applied by in-line sprinkling. The waxing of the fruit or vegetables is generally effected in the following manner.

According to a first embodiment, the fruit or vegetables are washed on lines of brushes, then drained and dried on lines of sponges in order to arrive clean and dry on lines of brushes specially designed for waxing of the fruit or vegetables. Sprinklers deliver the composition to the fruit or vegetables whilst they are moving over the brushes in order to enable application of a thin liquid layer to the fruit or vegetables. The fruit or vegetables then pass through a drying tunnel. Thus the evaporation of the water allows a protective film of approximately 2 micrometers to be left on the fruit or vegetables.

A second embodiment comprises the steps of first of all drying the fruit or vegetable and then sprinkling it with the composition comprising a volatile solvent as it passes over a roller conveyor, the air drying being carried out by simple evaporation of the solvent.

The third method of application comprises the steps of depositing the composition on the fruit or vegetables, already placed in the trays, by means of a manual sprinkler.

However, in-line application is preferred because it leaves on the fruit or the vegetable a protective film which is thinner and more homogeneous than with this latter method of application.

The compositions are preferably applied to fruit or vegetables which have previously been dried.

The combinations of abietic acid esters and terpenes may be in solution in alcohol or in emulsion in water.

According to a first embodiment, the compositions comprise one or more abietic acid ester(s) in combination with one or more terpene(s) which are not oxygen carriers in solution in a weak alcohol.

Preferably, the said compositions comprise:
between 1% and 35% by weight of one or more abietic acid ester(s) or mixtures thereof, in particular a resin based on abietic acid, preferably between 3% and 15%;
between 2% and 80% by weight of one or more terpenes, preferably between 5% and 30%;
between 10% and 95% of a weak alcohol, preferably between 50% and 95%.

The said solutions may also comprise one or more alkalis such as soda or potash. Generally, the compositions according to the invention comprise from 0.5 to 3% by weight of alkali.

According to another objective, the present invention also relates to these solutions.

According to another embodiment, the compositions may comprise one or more food wax(es) in combination with one or more terpene(s) which are not oxygen carriers and one or more resins.

The said compositions are generally in the form of an emulsion in water.

The said emulsion may be produced by means of anionic or non-ionic emulsifier(s), or a mixture of anionic and non-ionic emulsifier(s).

According to a first aspect, the said emulsions may be of the "anionic" type. They then comprise:

0.1% to 35% of terpene(s);
2% to 25% of wax(es);
2% to 8% of fatty acids;
0.5% to 4.5% of alkali;
1 to 8% of resin(s);
water: sufficient quantity.

According to another aspect, the emulsions may be of the "non-ionic" type. They then comprise:
0.1% to 35% of terpene(s);
2% to 25% of wax(es);
2% to 8% of non-ionic emulsifiers;
1 to 8% of resin(s);
water: sufficient quantity.

According to another aspect, the emulsions may be of the "mixed" type. They then comprise:
0.1% to 35% of terpene(s);
2% to 25% of wax(es);
1% to 8% of non-ionic emulsifiers; and
1% to 8% of fatty acids;
0.5% to 4.5% of alkali;
1 to 8% of resin(s);
water: sufficient quantity.

Preferably, the compositions according to the invention comprise from 1 to 20% of terpene(s) and from 10 to 25% of wax(es).

The resin(s) is (are) preferably up to a level of 1 to 5%.

The percentages indicated here are given by weight.

Such compositions have the following advantages:
complete emulsion of the wax(es);
low phytotoxicity for the fruit or vegetable;
use of ingredients permitted in the food sector;
high quality of coverage.

The compositions according to the invention are quite particularly suitable for coating fruit and vegetables, in particular citrus fruit, by the method according to the invention.

The present invention also relates to the method of preparation of the compositions according to the invention.

According to a first embodiment, this comprises the steps of:
1) mixing the terpene(s), optionally in solution with one or more resin(s), the wax(es) and the ionic and/or non-ionic emulsifier(s) (fatty acids and alkali) as defined above,
2) bringing the mixture to between 80 and 150° C.,
3) adding water previously brought to a temperature between 80° and 150° C., preferably to approximately 100° C.

According to a second embodiment, the method comprises the steps of:
1) mixing the wax(es) and the ionic and/or non-ionic emulsifier(s) (fatty acids and alkali) as defined above,
2) bringing the mixture to between 80 and 150° C.,
3) adding water previously brought to a temperature between 80° and 150° C., preferably to approximately 100° C.,
4) adding the terpene(s), optionally in solution with one or more resin(s).

The compositions according to the invention (solutions or emulsions) thus prepared are preferably applied pure, without previous dilution.

The quantity of composition which has to be applied depends upon the nature of the fruit or vegetables concerned and the chosen mode of application. Generally, between 100 and 5000 cm$^3$ of the composition are applied per tonne of fruit or vegetables, preferably between 500 and 1500 cm$^3$/t.

When the compositions are applied in solution in a solvent, the solvent is generally evaporated into the air. When the compositions are applied in emulsion, a step of drying is generally desirable in order to eliminate water.

According to the invention, the waxes may be chosen from amongst all waxes authorised for food use, in particular natural or synthetic waxes, such as carnauba waxes (E903), candelilla waxes (E902), beeswax (E901), microcrystalline wax (E905), montana wax or montanic acid ester (E912) and polyethylene waxes (E914) or mixtures thereof.

By way of resins, reference may be made in particular to resins of the lac type (shellac) (E904), pine resins, abietic acid or abietic acid esters such as esters with glycerol or pentaerythritol (E445), esterified resins chemically modified by creation of the maleic or fumaric adduct or mixtures thereof.

The expression "abietic acid ester(s)" comprises one or more abietic acid ester(s) with an alcohol, mixtures thereof as well as any resin comprising one or more abietic acid ester(s) or mixtures thereof. In particular the abietic acid ester with glycerol or pentaerythritol is preferred, more preferably with glycerol abietate. Reference may be made in particular to the commercial resins Ester Gum, Pexalyn® or Pentalyn® marketed by Hercules Inc., or Permalyn® marketed by Eastman.

By way of terpenes which are not oxygen carriers, reference may be made to pinenes and limonene, and more particularly limonene.

The expression "fruit and vegetables" preferably refers to the treatment of citrus fruit, such as oranges, lemons, clementines, grapefruit, mandarins.

The expression "weak alcohol" refers to alcohols comprising 1 to 6 atoms of carbon, preferably ethanol.

The wax may be any wax authorised for food use, in particular carnauba waxes, candelilla waxes, beeswax and the polyethylene waxes.

By way of fatty acids, the fatty acids of $C_{12}$ to $C_{18}$, and in particular oleic acid, are preferred.

The expression "alkali" is understood to mean any organic or mineral base, such as potassium hydroxide or sodium hydroxide, ammonium hydroxide or amine(s).

Various surfactants or emulsifiers are known per se. According to the present invention, "emulsifier" is understood to mean any type of agent usually used for this purpose, such as ethoxylated fatty alcohols, ethoxylated fatty acids, ethoxylated alkylphenols or any other non-ionic product.

The surfactants, preferably used in the context of the invention are anionic or non-ionic surfactants.

Examples of non-ionic surfactants which can be used according to the invention are in particular the condensation product of an aliphatic fatty alcohol, preferably of $C_8$-$C_{22}$, or of a $C_2$-$C_3$ alkylene oxide. The $C_2$-$C_3$ alkylene oxide may be ethylene oxide, propylene oxide, or a mixture of ethylene oxide and propylene oxide in any proportions. An example of such surfactants is the condensation product of lauryl alcohol (or n-dodecyclic alcohol) with 30 moles of ethylene oxide.

The emulsifiers may also contain other agents usually used in coating waxes.

The non-ionic emulsifiers include in particular sucroesters, ethoxylated sorbitan monooleates, ethoxylated fatty acids, lecithin, esterified fatty acids such as glycerol oleate and mixtures thereof.

Examples of anionic surfactants which can be used according to the invention are in particular the alkaline salts of fatty acids with organic or mineral base, such as alkali metal hydroxides (soda or potash), ammonium hydroxide or amine(s). The salt may be introduced into the composition or formed in situ.

However, the invention is not limited to the use of these particular surfactants.

The following examples are given by way of illustration and do not limit the present invention.

EXAMPLE 1

Solution in Ethanol

A solution was prepared from 10 g of glycerol abietate resin, 18 g of limonene and 3 g of ethanol in such a way as to solubilise the different ingredients. Then the complement of ethanol was added in such a way as to obtain 100 mL of solution. Thus a completely soluble and stable solution was obtained.

EXAMPLE 2

Solution in Ethanol

A solution was prepared from 10 g of glycerol abietate resin, 18 g of limonene and 56 g of ethanol in such a way as to solubilise the different ingredients. Thus a completely soluble and stable solution was obtained.

EXAMPLE 3

Preparation of an Ionic Emulsion 2.5 g of limonene were mixed with 2 g of glycerol abietate resin. 17 g of carnauba wax were added and mixed. The mixture obtained was emulsified in water by addition of 5 g of oleic acid and 1 g of potassium hydroxide, the volume of 100 ml having been made up with water. Thus an emulsion was obtained.

EXAMPLE 4

Preparation of a Non-Ionic Emulsion

The procedure was as in Example 2, but using 4 g of non-ionic emulsifier composed of a mixture of 1 g of sucroester, 1.5 g of ethoxylated sorbitan monooleates and 1 g of lecithin.

EXAMPLE 5

Treatment of Oranges

The fruit were washed with a detergent solution then rinsed and dried completely. The resin emulsion (Example 3) was applied at the rate of 1.5 L per tonne of fruit, under pressure, by nozzles placed above the conveyor over which the fruit pass. A rotary fan drew in air in such a way as to aid the drying of the fruit and evacuate the evaporated solvents to the exterior. The waxed and dried fruit were then packed.

EXAMPLE 6

Treatment of Oranges

The fruit were washed with a detergent solution then rinsed and dried completely. The resin solution (Example 1) was applied, at the rate of 1.5 L per tonne of fruit, under pressure, by nozzles placed above the conveyor over which the fruit pass. The fruit were dried by evaporation of the solvents to the air.

EXAMPLE 7

Preparation of an Ionic Emulsion 2.5 g of limonene were mixed with 2 g of glycerol abietate resin. 17 g of carnauba wax were added and mixed. The mixture obtained was emulsified in water by addition of 5 g of oleic acid and 1 g of potassium hydroxide, the volume of 100 ml having been made up with water. Thus an emulsion was obtained.

EXAMPLE 8

Preparation of a Non-Ionic Emulsion

The procedure was as in Example 7, but using 4 g of non-ionic emulsifier composed of a mixture of 1 g of sucroester, 1.5 g of ethoxylated sorbitan monooleate and 1 g of lecithin.

EXAMPLE 9

Preparation of an Emulsion of Waxes without Resins 21 parts of carnauba were dissolved in 2 parts of limonene, 5.5 parts of oleic acid, 4 parts of ammonium hydroxide at 28%. The mixture was heated to 100°, the complement of water was added up to 100°, with vigorous stirring, until the mixture was completely emulsified.

EXAMPLE 10

Treatment of Oranges

The fruit were washed with a detergent solution then rinsed and dried completely. The compositions of Examples 7 and 9 were applied, at the rate of 1.5 L per tonne of fruit, under pressure, by nozzles placed above the conveyor over which the fruit pass. The fruit were dried by passing through a drying tunnel with hot air. The waxed and dried fruit were then packed.

The fruit were evaluated in terms of appearance and loss of weight by comparison with a conventional formulation based on carnauba wax and shellac (product A) and with a wax of polyethylene and modified resin ester (product B). The following results were obtained:

| Type of wax | Loss of weight after 1 month of storage at 5° C. | Initial sheen after waxing (scale 0 to 10) | Final sheen after 1 month of storage at 5° C. (scale 0 to 10) |
| --- | --- | --- | --- |
| Product A (carnauba/shellac) | 28% | 7.5 | 7 |
| Product B (polyethylene/resin) | 15% | 10 | 7 |
| Example 7 (carnauba/gum A/limonene) | 37% | 9 | 8.5 |
| Example 9 (carnauba/limonene) | 50% | 8.5 | 8 |

The invention claimed is:
1. A method of coating a fruit or a vegetable, comprising sprinkling a composition comprising at least one abietic acid ester and limonene, in solution in ethanol, to the fruit or the vegetable, wherein the composition does not comprise water and does not comprise an emulsifier.

2. The method according to claim 1, wherein the at least one abietic acid ester is selected from the group consisting of abietic acid ester with glycerol, abietic acid ester with pentaerythritol, and a resin comprising an abietic acid ester.

3. The method according to claim 1 wherein the at least one abietic acid ester is a resin ester gum.

4. The method according to claim 1, wherein the composition is applied to the fruit or the vegetable after harvesting and before marketing of the fruit or the vegetable.

5. The method according to claim 1, wherein between 100 and 5000 cm$^3$ of the composition is applied per tonne of the fruit or the vegetable.

6. The method according to claim 1, wherein the composition is applied by sprinkling on the fruit or the vegetable wherein the fruit or the vegetable is dry.

7. The method according to claim 1, wherein the composition further comprises one or more resins.

8. A composition for coating a fruit or a vegetable, comprising:
   between 1% and 35% by weight of a resin comprising at least one abietic acid ester;
   between 2% and 80% by weight of limonene; and
   between 10% and 95% of ethanol
wherein the resin and limonene are in solution in the ethanol, and wherein the composition does not comprise water and does not comprise an emulsifier.

9. The composition according to claim 8, further comprising a second resin.

10. The composition according to claim 9, wherein the second resin is shellac.

11. The method according to claim 1, wherein the composition comprises
   between 1% and 35% by weight of a resin comprising at least one abietic acid ester;
   between 2% and 80% by weight of limonene; and
   between 10% and 95% of ethanol.

* * * * *